United States Patent [19]
Lewandowski et al.

[11] Patent Number: 5,149,114
[45] Date of Patent: Sep. 22, 1992

[54] NESTABLE CARGO CART

[75] Inventors: Mark S. Lewandowski, White Bear Lake; David M. Gessner, Lino Lakes; Robert C. Anthony, North Oaks, all of Minn.

[73] Assignee: Smarte Carte Inc., White Bear Lake, Minn.

[21] Appl. No.: 720,891

[22] Filed: Jun. 25, 1991

[51] Int. Cl.⁵ .............................. B62B 5/02
[52] U.S. Cl. .................. 280/33.992; 280/33.997; 280/62
[58] Field of Search ............ 280/33.997, 33.996, 280/33.995, 33.994, 33.992, 33.991, 33.993; 186/62, 63, 64, 65, 66; 194/905

[56] References Cited

U.S. PATENT DOCUMENTS

| | | | |
|---|---|---|---|
| D. 155,971 | 11/1949 | Concklin | 280/33.997 |
| D. 206,116 | 11/1966 | Hughes | D14/3 |
| D. 230,142 | 1/1974 | Muellner | D12/22 |
| D. 263,456 | 3/1982 | Meullner | D34/18 |
| 2,992,010 | 7/1961 | Sides | 280/33.99 |
| 4,381,870 | 5/1983 | Muellner | 280/33.99 |
| 4,450,968 | 5/1984 | Muellner | 211/17 |
| 4,518,072 | 5/1985 | Muellner et al. | 194/4 D |
| 4,733,877 | 3/1988 | Pastien | 280/33.99 R |

FOREIGN PATENT DOCUMENTS

| | | | |
|---|---|---|---|
| 3829187 | 4/1989 | Fed. Rep. of Germany | 280/33.991 |
| 1401331 | 4/1965 | France | 280/33.997 |

Primary Examiner—David M. Mitchell
Attorney, Agent, or Firm—Merchant, Gould, Smith, Edell, Welter & Schmidt

[57] ABSTRACT

A nestable cargo cart 10 suitable for carrying a plurality of cargo items is disclosed. The cart includes a lower frame 11 disposed about a longitudinal axis having longitudinally spaced forward and aft ends 11a and 11b respectively, wheels operatively connected to the lower frame 11, aft upright members 20a and 20b operatively connected to the lower frame 11 adjacent to the aft end 11b and rising generally vertically upward in the first vertical orientation, forward upright members 15a and 15b operatively connected to the lower frame adjacent to the forward end 11a and rising generally vertically upward in the second vertical orientation, and first and second cargo retainers 33a and 33b operatively connected to the aft upright members 20a and 20b and disposed generally inward. The forward and aft upright members 33a and 33b are angled with respect to each other, and the cart is arranged and configured to allow similar carts to be stored in a nested mananer, the forward end 11a of the first cart passing through the opening in the aft end 11b of a second cart.

14 Claims, 4 Drawing Sheets

NESTABLE CARGO CART

Field of the Invention

The invention relates generally to a cart apparatus and, more particularly, to the self service carts of the type used to carry bulky or heavy cargo or luggage items over significant distances such as in transportation terminals.

BACKGROUND OF THE INVENTION

Large transportation passenger terminals (such as airports and train stations) have exhibited a need for rugged, low maintenance and versatile, self service carts for personal use. These carts have requirements such as convenience in use, availability, public acceptance, and durability, i.e. carts which are rugged and can withstand continuous day to day use and abuse by the public, with minimal required maintenance. In addition, many carts have a child seat.

Numerous cart designs have been applied to such applications in the past. However, relatively few cart systems have been used successfully in transportation facilities due to problems such as theft, lack of rental mechanisms, and cart distribution problems.

One cart system that has and is experiencing considerable success in airport terminals is the automatic self serving cart vending system which provides a reward for the return of the cart to strategically positioned vending islands. Such a system is described in U.S. Pat. No. 3,978,959, by the assignee hereof, hereby incorporated by reference. In that system, the individual carts cooperatively engage with one another in a "nesting" relationship, enabling high packing density in a relatively samll vending island, thereby offering considerable space saving and orderly cart distribution throughout a facility.

While the cart distribution concept disclosed in U.S. Pat. No. 3,978,959 has proven itself over a number of years, improvements to the cart disclosed therein are taught in two additional patents, U.S. Pat. Nos. 4,381,870 and 4,733,877, both by the assignee hereof and, both hereby incorporated by reference. While the carts disclosed in these references are very versatile, the cart described in U.s. Pat. No. 4,381,870 may be tipped over due to loading capabilities and weight distribution. The cart described in U.S. Pat. No. 4,733,877 represents an improvement in weight distribution and loadability of the carts. However, this cart is designed to be pulled, the handle is an obstruction to the easy loading of luggage, the front luggage restraint is a movable, short structure which is susceptible to ratling and other maintenance problems. In addition, as this restraint may not always completely be in a lowered state in a nesting operation, it provides a locus for entanglement of the nested carts.

Thus, a more easily loaded, durable cargo cart which offers expanded loading area is needed which does not experience tangling problems in nested storage.

SUMMARY OF THE INVENTION

The invention is directed to a nestable cargo cart suitable for carrying a plurality of cargo items having a lower frame disposed about a longitudinal axis having longitudinally spaced apart forward and aft ends and wheel means operatively connected to the lower frame. The cart includes first and second upright members operatively connected to the lower frame adjacent the aft end and rising generally vertically upward in a first vertical orientation. The cart also has a third and fourth members operatively connected to the lower frame adjacent to the forward end and rising generally vertically upward in a second vertical orientation. The first and second vertical orientations are related in a manner wherein a first horizontal dimension between a lower portion of the first and second upright members at a first elevation from the floor surface and a lower portion of the third and fourth upright members at the first elevation is less than a second horizontal dimension between an upper portion of the first and second upright members at a second elevation from the floor surface and an upper portion of the third and fourth upright members at the second elevation.

In another embodiment, the cargo cart also has first and second cargo retaining means operatively connected to the first and second upright members respectively disposed generally inward. Each of the cargo retaining means has a top and bottom portion and a width dimension measured from the upright member to which it is operatively connected. The width of the first and second cargo retaining means increases from the top portion to a maximum located intermediate the top and bottom portions and decreases towards the bottom portion.

The invention is advantageous in that it enables users to establish a low center of gravity of cargo placed on the carts. The cart also has forward and aft upright members to support luggage items. In addition, the forward (third and fourth) upright members of a first cart and the aft cargo retaining means of a second cart can interact in operations inserting one cart into another to form a nested configuration or removing one cart from another from a nested configuration to prevent entanglement of the carts. In addition, advertising, courtesy and instruction signs may be inserted or affixed to the cart.

These and other features of the invention will become apparent from a consideration of the following specifications and accompanying drawings which form a part of this application.

DETAILED DESCRIPTION OF THE PREFERRED EMBODIMENT OF THE INVENTION

Figure 1:
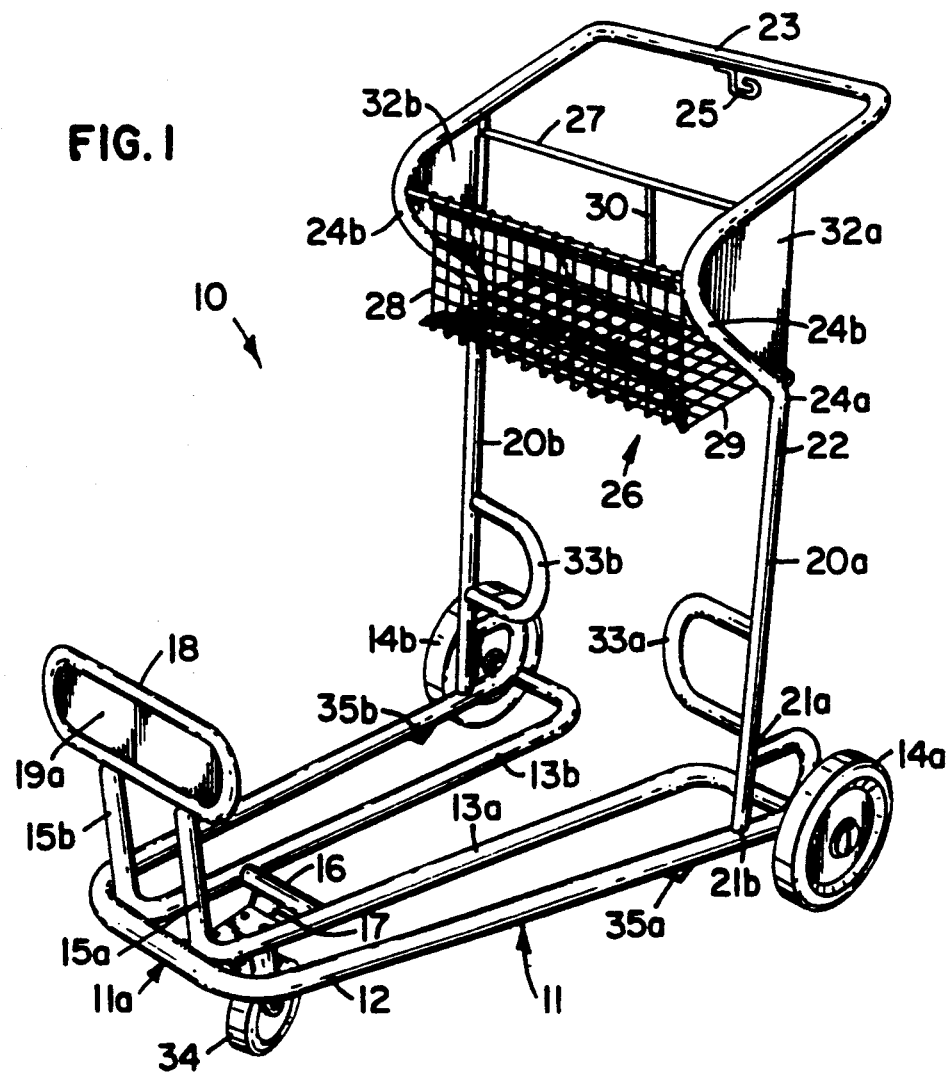
FIG. 1 is a perspective view of the cart apparatus of the invention.
Figure 2:
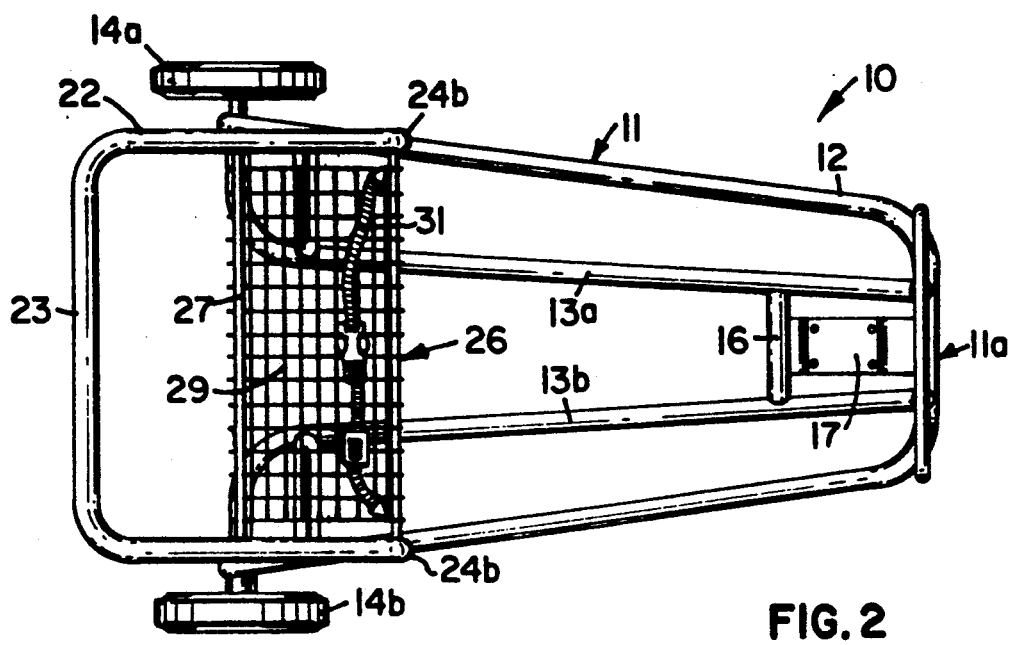
FIG. 2 is a top elevation of the cart apparatus of FIG. 1.
Figure 3:
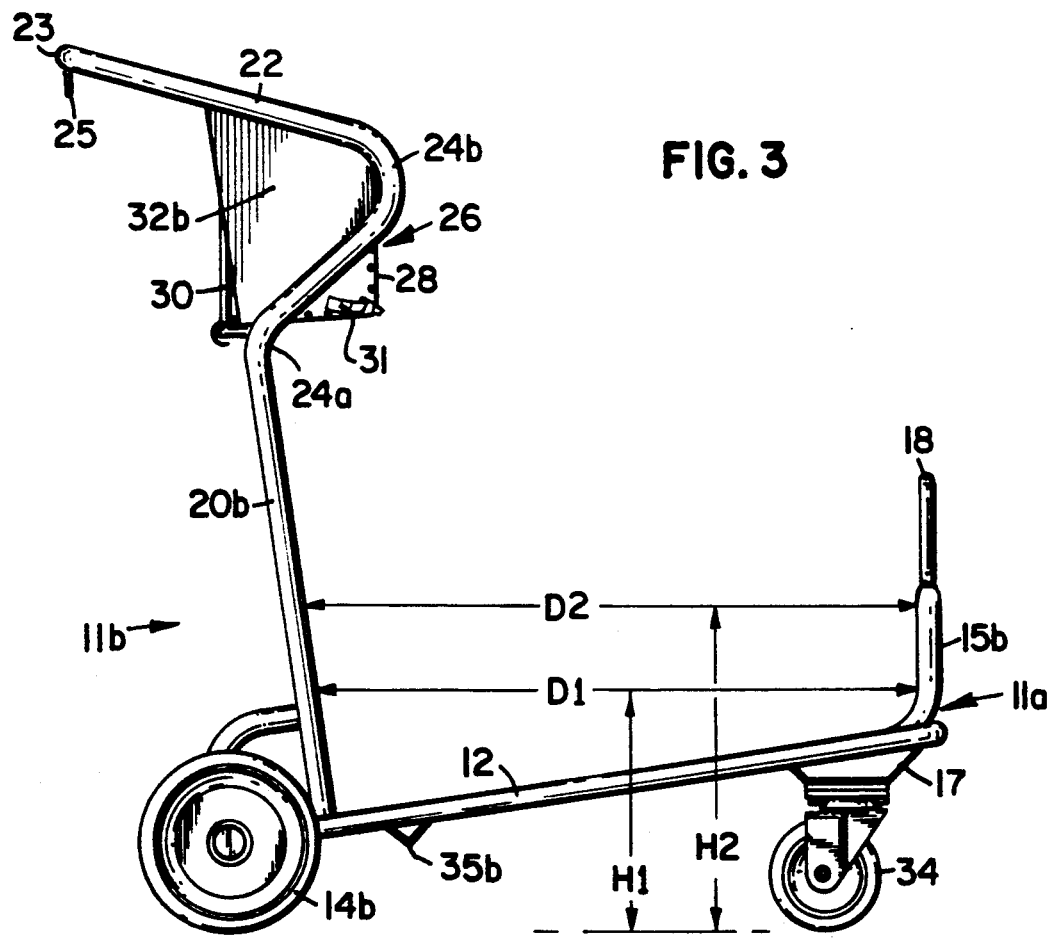
FIG. 3 is a right side elevation of the cart apparatus of FIG. 1, the left side elevation being a mirror image thereof.
Figure 4:
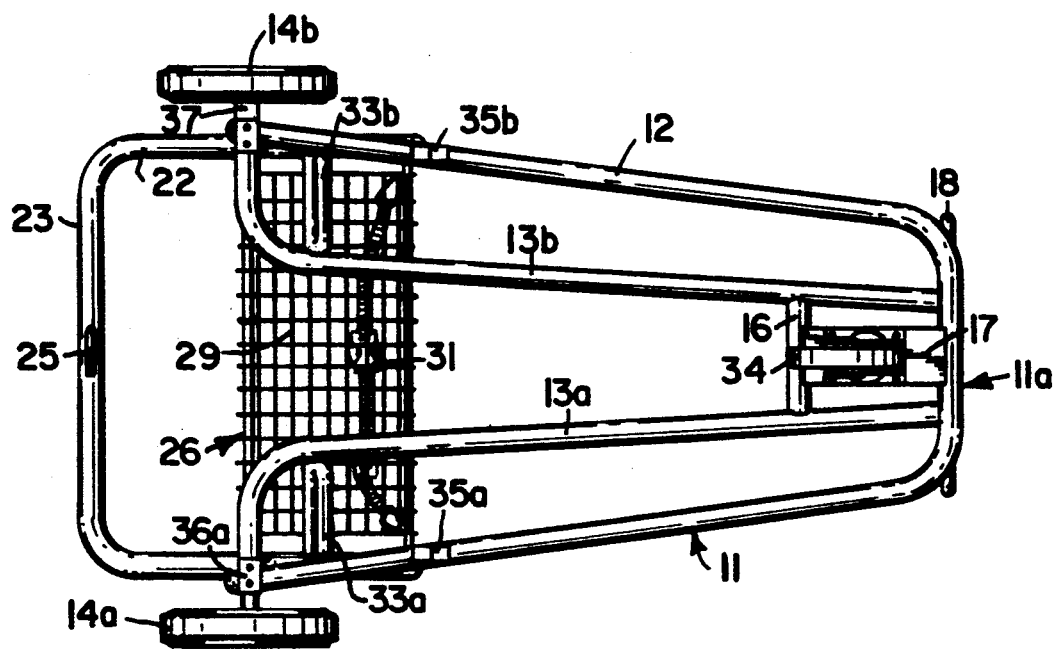
FIG. 4 is a bottom elevation of the cart apparatus of FIG. 1.
Figure 5:
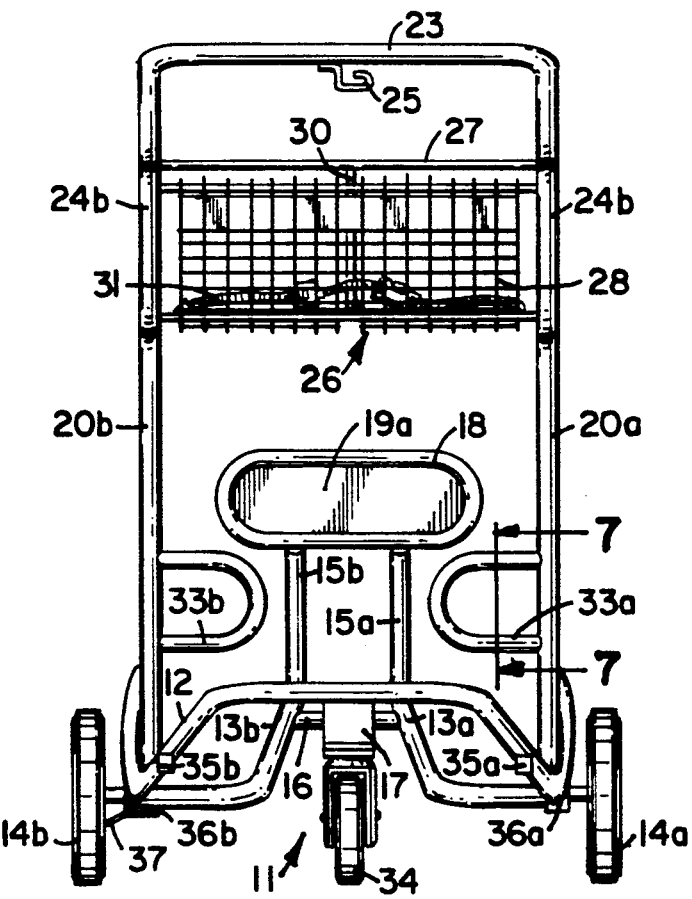
FIG. 5 is a front elevation of the cart apparatus of FIG. 1.
Figure 6:
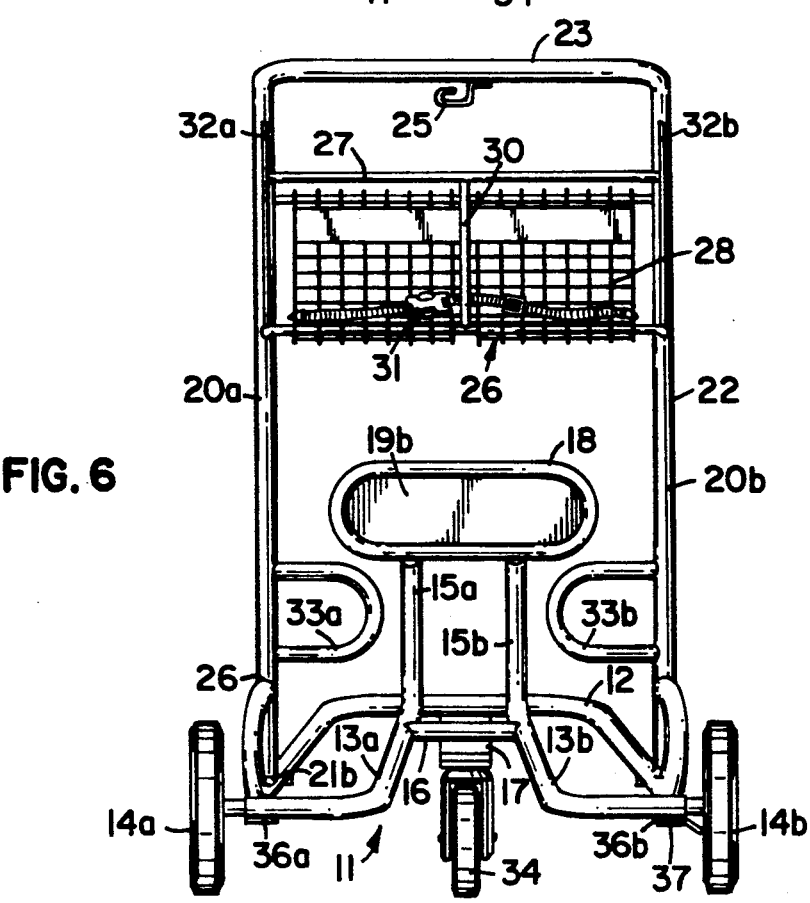
FIG. 6 is a rear elevation of the cart apparatus of FIG. 1.

Referring to the drawing, wherein like numerals represent like parts throughout the several views, there is generally disclosed at 10 a cart. The cart 10 is of the type normally used and particularly suited for use in carrying luggage or other cargo in passenger terminals such as airports, and it is also applicable for use in a self service automatic vending system of the type described in U.S. Pat. No. 3,978,959. Referring to FIGS. 1 through 7, the cart 10 has a lower frame portion 11 which is disposed by the longitudinal axis and is generally symmetrical thereabout having a forward end, generally designated at 11a and an aft end, generally designated at 11b. The lower frame 11 is, in the preferred embodiment, of tubular construction, and is, in the preferred embodiment, constructed of tubular stainless steel members, as are the other tubular members of the cart. In the preferred embodiment, the lower frame 11 has an outer, generally U-shaped tube 12, being open at the aft end and extending forward toward the forward end and being enclosed at the forward end. The transverse width of the outer tube of 12 tapers from a generally broad width at the aft end 11b to a relatively narrow width at the forward end 11a for enhancing nesting of the cart with other carts of like configuration, as described in more detail hereinafter. Additional lower frame members 13a and 13b begin at the aft end forming axles for rear wheels 14a and 14b, turning to run in a longitudinal direction, meeting the U-shaped tube 12 at the forward end 11a and turning upward in a generally vertical direction to form a forward pair of upright members, 15a and 15b respectively. Proximate the forward end 11a of the lower frame, a transverse member 16 is operatively connected or mounted to the lower frame members 13a and 13b. As herein discussed in the Preferred Embodiment, any suitable means known to those skilled in the art may be used to form the connections between and among the tubular components of the cart 10. Such means include welding, riveting, bolting. Preferably, the tubular members of the cart 10 are welded. A caster mounting member 17 is disposed between and mounted (e.g., by welding) to the transverse member 16 and the front portion of the U-shaped tube 12. The respective tubular portions collectively comprising the lower frame 11 are generally mounted in a common plane, and their respective upper surfaces collectively define a broad support surface, particularly suitable for carrying items of luggage or baggage, and other bulky cargo items.

The forward pair of vertical members 15a and 15b can have mounted to them a display member 18 having a forward display surface 19a and an aft display surface 19b. The forward pair of upright members 15a and 15b can combine with the display member 18 to provide a forward cargo retaining construction which has a vertical dimension from the lower frame support surface to the upper portion of the display member which is generally a greater distance than one-half of the height of the standard, large pullman type luggage. A pair of aft upright members 20a and 20b respectively are welded to the outer U-shaped tube 12 proximate its aft end 11b. In a preferred embodiment, the outer U-shaped tube 12, is arranged and configured to contact each of the aft upright members 20a and 20b at two points, e.g. at 21a and 21b to provide structural integrity. In a preferred embodiment, the aft vertical members 20a and 20b are portions of a single tubular member 22 which is arranged and configured to form a handle portion 23 at the upper aft end of the cart 10. The rear tubular member 22 may be arranged and configured to curve in a forward sloping upward manner at a predetermined position 24a and, at a second predetermined position 24b, curved more nearly horizontally aft and arranged to form a closed configuration at the aft, upper portion thereof. This portion will then form the handle 23. In a preferred embodiment, a purse hanger 25 is welded to the handle 23 of the cart 10.

Mounted to the upper, curved portions of the aft tubular member 22, a suitable seat, generally designated as 26 may be positioned. The seat 26 includes a transverse bar 27 welded to the aft tubular member 22 near the aft end and a seat back 28, a seat bottom 29 and a vertical restraint bar 30 welded to a mid point of the transverse bar 27 and the seat bottom 29 at its aft end. The seat may be of any suitable construction, and preferably comprises a seat belt 31.

In addition, the aft tubular member 22 may have welded thereto side plates 32a and 32b to provide structural stability and enclosure means for the seat 26.

In a preferred embodiment, welded to the aft pair of upright members 20a and 20b are disposed rear cargo retaining means 33a and 33b respectively. In a preferred embodiment, the cargo retaining means 33a and 33b are constructed of tubular steel having a short horizontal portion extending inward from the upright members, a semicircular portion extending downward from the upper vertical portion, and the cargo retaining means returns to the upright members through a second short vertical portion. More preferably, the tubular members are constructed of tubular stainless steel.

The cart 10 is supported for movement by wheel means comprising a pair of primary support wheels 14a and 14b and a caster 34. The primary support wheels 14a and 14b are mounted on stub axle extensions projecting outwardly from the sides of the lower frame 11 at the trailing end 11b thereof such that the primary support wheels 14a and 14b are coaxially aligned and project outwardly from the lower frame 11. The caster 34 is bolted to the caster mounting member 17 by means of a caster mounting apparatus for rotation about a generally vertical axis.

The embodiment of the cart is described as particularly suitable for a nesting engagement with carts of like construction. It is noted that the width or spacing between the lower frame members 13a and 13b about the longitudinal axis of the lower frame 11 is sized to permit unimpeded passage of canter 34 and its support structure 17, when a second cart is nested with a first cart. In addition, the rear cargo retaining means 33a and 33b are configured and arranged to permit unimpeded passage of the forward upright members 15a and 15b and display member 18 when a second cart is nested with a first cart. The nesting function of the cart 10 is further enhanced by the tapered construction of the lower frame 11 portion of the cart. The tapered feature enables the forward end 11a of a first cart to be easily placed between the upright support members 20a and 20b of a second cart and to act as a guide for positioning the two carts into full nesting position, with a minimal amount of force or effort required. To further assist in nesting of the carts, the lower frame 11 is mounted on the wheel support mechanism at an angle with respect to the floor surface. This angle enables the lower frame 11 of a first cart to ride above the upper surface of the lower frame portion of a second cart when in nesting engagement. The acute angle can range from preferably 5° to 15°, and more preferably between 5° and 10°. In the preferred embodiment of the invention, the acute angle is approximately 8°.

In addition, in order to increase the carrying capacity of the cart and to help to prevent entanglement of carts in a nesting arrangement, it is preferred that the forward upright members 15 and 15b and aft upright members 20a and 20b be at an angle to each other. This can be accomplished wherein the aft upright members 20a and 20b rise generally vertically upward in a first vertical orientation and the forward upright members 15a and 15b rise generally vertically upward in a second vertical orientation. The first and second vertical orientations may be related such that, at a first elevation from the floor surface Hl, a first horizontal dimension Dl between a lower portion of the aft upright members 20a and 20b and a lower portion of the forward upright members 15a and 15b is less than a second horizontal dimension D2 between an upper portion of the aft upright members 20a and 20b and an upper portion of the forward upright members 15a and 15b, at a second elevation from the floor surface H2. This arrangement may be accomplished through a configuration wherein the aft upright (first and second) members are welded to the lower frame at about a 90° angle. At the same time, the forward upright members (third and fourth upright) arise from the lower frame at an angle of greater than about 90 degrees, preferably about 95° to 105°, more preferably about 95° to 100°, and most preferably about 98°.

The angled relationship between the forward and aft upright members 15a, 15b, 20a and 20b respectively also helps to prevent the entanglement of nested carts. Because the rear cargo retaining means 33a and 33b have a width dimension which increases from the top portion to a maximum located intermediate the top and bottom portion and decreases toward the bottom portion of the cargo retaining member, contact between the forward upright members 15a and 15b of one cargo cart with the cargo retaining means 33a and 33b of a second cargo cart results in contact at a single point at an oblique angle. Due to the nature of this contact, the first and second carts will move with respect to one another whereby the forward upright members 15a and 15b of a first cart will be centered within the cargo retaining means 33a and 33b of a second cart and thereby will pass through the opening defined by the rear upright members 20a and 20b, lower frame 11 and cargo retaining means 33a and 33b of the second cart.

Figure 7:
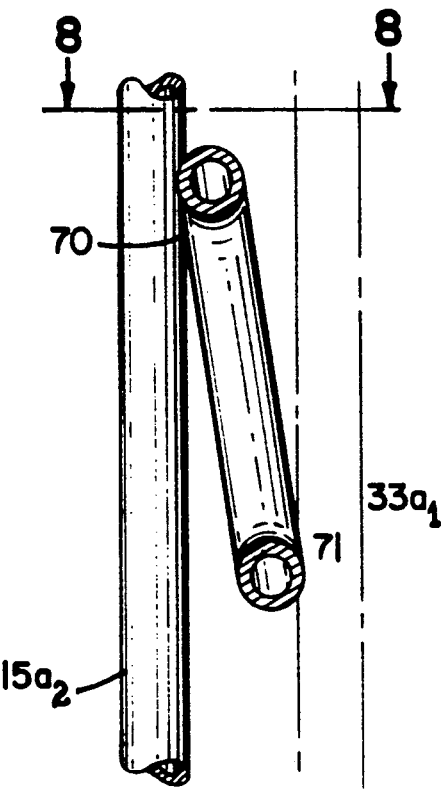
FIG. 7 is a cross sectional view along line 7—7 of FIG. 5, and it illustrates the interaction between the cargo retaining means of the first cart and the front (third and/or fourth) upright members of a second cart during a nesting or de-nesting operation.
Figure 8:
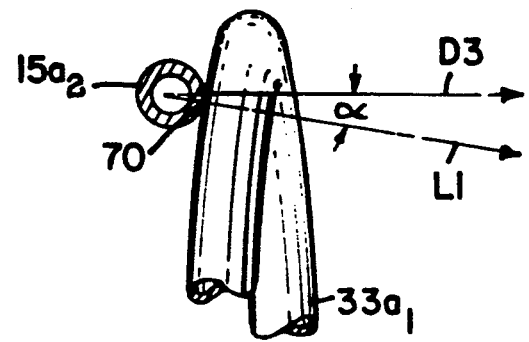
FIG. 8 is a cross sectional view along line 8—8 of FIG. 7, and it also illustrates the interaction between the cargo retaining means of the first cart and the front (third and/or fourth) upright members of a second cart during a nesting or de-nesting operation.

FIGS. 7 and 8 illustrate the relationship between the left cargo retaining member $33a_1$ of a first cart and the left forward upright member $15a_2$ of a second cart in both "nesting" and "unnesting" operations. The subscripts 1 and 2 refer to the first and second carts respectively. In a "nesting" operation, the forward upright member $15a_2$ approaches the cargo retaining means $33a_1$ in a motion from left to right in FIG. 7. The point of contact between the upright member $15a_2$, and the cargo retaining member $33a_1$ is designated as 70 and occurs on the radiused portion of the cargo retaining means $33a_1$. The angle, $\alpha$ between a line indicating the initial direction of travel D3 of the upright member $15a_2$, and a line Ll intersecting the center of the upright member $15a_2$, and the point of contact 70 is oblique, and it is readily apparent that this contact angle $\alpha$ imparts a sideways force toward the longitudinal axis of the cart on the upright member $15a_2$. This results in the upright member $15a_2$ sliding past the cargo retaining member 33a to ultimately form a nested configuration between the two carts. Of course, if the two carts are properly aligned, there will be no contact between the cargo retaining means $33a_1$ and the upright member $15a_2$. If the two carts are not properly aligned, there will be contact between either the right upright member $15b_2$ and the right cargo retaining means $33b_1$ or the left upright member $15a_2$ and the left cargo retaining means $33a_1$, but not both simultaneously.

In an "unnesting" operation, a forward upright member $15a_2$ approaches the cargo retaining means $33a_1$ from right to left in FIG. 7. The point of contact between the upright member $15a_2$ and cargo retaining member $33a_1$ is designated at 71 and occurs on the radiused portion of the cargo retaining means $33a_1$. Again, the contact angle between the two members is oblique and guides the form and upright member $15a_2$ toward the opening in the first cart and ultimately passes through the rear of the first cart so the second cart can be operated independently on the first cart. Again, if the two carts are properly aligned, there will be no contact between the forward upright members $15a_2$ and $15b_2$ and the cargo retaining means $33a_1$ and $33b_1$.

The size of the primary support wheels 14a and 14b as well as the size of the caster wheel 34 can vary depending upon the particular application to which the cart is to be put. The diameter of the primary support wheel can preferably vary from 4 to 12 inches and more preferably between 6 and 10 inches. In a preferred embodiment, a diameter of 8 inches for the primary support wheel has been the wheel portion of the caster 34 can similarly vary, and preferably will be between $2\frac{1}{2}$ and $7\frac{1}{2}$ inches. In a preferred embodiment of the invention, a caster wheel diameter of approximately 5 inches has been found to operate satisfactorily.

In addition, a pair of stop members 35a and 35b downwardly project from, and are welded to, the U-shaped tube 12 of the lower frame 11. The stop members 35a and 35b are longitudinally positioned on the lower frame 11 distance slightly greater than the diameter of the primary support wheels 14a and 14b, and serve the function of L20 spacing the primary support wheels 14a and 14b of two successively nested carts from one another to permit ease of steering and movement of a large number of such carts when in a nested arrangement. The stop members 35a and 35b retainably engage the aft surface of the stub axles on the lower frame members 13a and 13b of a forwardly positioned nesting cart. Finally, anti-reversing mounting pads 36a and 36b are welded to a bottom of the stub axle portion of the left and right lower frame members 13a and 13b proximate the primary drive wheels 14a and 14b. An anti-reversing bracket 37, projecting generally outwardly and downwardly toward the primary drive wheel 14a or 14b, is bolted the bottom of either the left or right mounting pad 36a or 36b depending on the desired orientation of the cart in a cart vending system. Preferably, the anti-reversing member 37 is mounted on the right mounting pad 36b. This anti-reversing member 37 effectively prevents a user from introducing the cart 10 in a backwards orientation into a cart vending system for example as described in U.S. Pat. No. 3,978,959. This anti-reversing bracket 37 increases the vertical clearance around the chosen stub axle necessary to accept such axle with respect to vertical clearance required to accept the other stub axle. Therefore, the chosen stub axle with the anti-reversing bracket 37 cannot be introduced into a slot configured only to receive the narrower stub axle.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the invention which follow in the spirit and broad scope of the appended claims are included.

What is claimed is:

1. A nestable cargo cart suitable for carrying a plurality of cargo items, the cart comprising:
   (a) a lower frame disposed about a longitudinal axis having longitudinally spaced forward and aft ends;
   (b) wheel means operatively connected to the lower frame;
   (c) first and second upright members operatively connected to the lower frame adjacent the aft end and rising generally vertically upward in a first vertical orientation;
   (d) third and fourth upright members operatively connected to the lower frame adjacent the forward end and rising generally vertically upward in a second vertical orientation wherein, at a first elevation from the floor surface, a first horizontal dimension between a lower portion of the first and second upright members and a lower portion of the third and fourth upright members is less than a second horizontal dimension between an upper portion of the first and second upright members and an upper portion of the third and fourth upright members at a second elevation from the floor surface; and
   (e) first and second cargo retaining means operatively connected to the first and second upright members, respectively, and disposed generally inward, each cargo retaining means having top and bottom portions and a width dimension measured from the upright member;
wherein the width of the first and second cargo retaining means increases from the top portion to a maximum located intermediate the top and bottom portions and decreases toward the bottom portion.

2. The cargo cart of claim 1 wherein the first and second cargo retaining means are tubular.

3. The cargo cart of claim 1 wherein, in a nesting operation, the first and second cargo retaining means of a first cart contact the third and fourth upright members of a second cart at a single point with an oblique angle.

4. The cargo cart of claim 1 wherein the lower frame and the first and second upright members form an angle of about 90°.

5. The cargo cart of claim 1 wherein the forward end of the lower frame is elevated with respect to the aft end.

6. The cargo cart of claim 1 wherein the lower frame and the third and fourth upright members form an angle of greater than about 90°.

7. The cargo cart of claim 1 wherein the lower frame and the third and fourth upright members form an angle of about 95° to 100°.

8. The cargo cart of claim 1 wherein the third and fourth upright members are arranged and configured to display at least one sign.

9. The cargo cart of claim 1 wherein the first and second cargo retaining means, intermediate the top and bottom portions thereof, is arranged and configured in a curvilinear manner.

10. The cargo cart of claim 9 wherein the first and second cargo retaining means, intermediate the top and bottom portions thereof, comprise a radiused portion.

11. The cargo cart of claim 10 wherein the first and second cargo retaining means of the first cart are arranged and configured to contact the third and fourth upright members of the second cart on a radiused portion of the cargo retaining means.

12. The cargo cart of claim 1 further comprising first and second primary support wheels coaxially operatively connected to the lower frame adjacent to the aft end and at oppositely disposed sides thereof and at least one caster, rotatable about a vertical axis, symmetrically operatively connected to the lower frame about its longitudinal axis and adjacent to the forward end thereof, wherein the primary support wheels and the at least one caster movably support the lower frame and cart on a floor surface.

13. The cargo cart of claim 1 further comprising a handle operatively connected to the first and second upright members.

14. A nestable cargo cart suitable for carrying a plurality of cargo items, the cart comprising:
   (a) a lower frame disposed about a longitudinal axis having longitudinally spaced forward and aft ends;
   (b) first and second primary support wheels coaxially operatively connected to the lower frame adjacent to the aft end and at oppositely disposed sides thereof;
   (c) at least one caster, rotatable about a vertical axis, operatively connected to the lower frame symmetrically operatively connected about its longitudinal axis and adjacent to the forward end thereof, wherein the primary support wheels and the caster movably support the lower frame and cart on a floor surface;
   (d) tubular first and second upright members having a first horizontal separation operatively connected to the lower frame adjacent the aft end at an angle of about 90° and rising generally vertically upward;
   (e) tubular third and fourth upright members having a second horizontal separation, which is less than that of the first and second upright members, operatively connected to the lower frame adjacent the forward end at an angle of greater than about 90° and rising generally vertically upward;
   (f) tubular first and second cargo retaining means having top and bottom portions operatively connected to the first and second upright support members, respectively, and disposed generally inward; and
   (g) a handle operatively connected to the first and second upright members;
wherein the point of greatest extension of the first and second cargo retaining means is located at a vertical elevation intermediate the top and bottom portions thereof, the extension of the first and second cargo retaining means from the first and second upright members decreases toward the top and bottom portions thereof, the minimum horizontal distance between the first and second cargo retaining means is greater than the horizontal distance between the third and fourth upright members, and the cargo cart is capable of forming a nested configuration with a second, identical cargo cart.

* * * * *